(12) United States Patent
Huang et al.

(10) Patent No.: US 12,521,820 B2
(45) Date of Patent: Jan. 13, 2026

(54) WELDING QUALITY DETECTION SYSTEM AND METHOD

(71) Applicant: CONTEMPORARY AMPEREX TECHNOLOGY CO., LIMITED, Ningde (CN)

(72) Inventors: Shumao Huang, Ningde (CN); Deming Xu, Ningde (CN); Yupei Chen, Ningde (CN); Nishan Zheng, Ningde (CN); Wenfang Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/251,944

(22) Filed: Jun. 27, 2025

(65) Prior Publication Data

US 2025/0319552 A1   Oct. 16, 2025

Related U.S. Application Data

(63) Continuation of application No. PCT/CN2024/096060, filed on May 29, 2024.

(30) Foreign Application Priority Data

Feb. 5, 2024   (CN) .................. 202410161178.8

(51) Int. Cl.
*B23K 31/12* (2006.01)
*B23K 101/36* (2006.01)
*G06T 7/00* (2017.01)

(52) U.S. Cl.
CPC ............ *B23K 31/125* (2013.01); *G06T 7/001* (2013.01); *B23K 2101/36* (2018.08); *G06T 2207/30152* (2013.01)

(58) Field of Classification Search
CPC .. B23K 2101/36; B23K 31/125; G06T 7/001; G06T 2207/30152; G01N 21/95; G01N 21/88
See application file for complete search history.

(56) References Cited

U.S. PATENT DOCUMENTS 6,088,474 A     7/2000  Dudasko et al.
11,589,955 B2 * 2/2023  Medvinskaya ........ A61C 13/34
(Continued)

FOREIGN PATENT DOCUMENTS

CA    2359221 A1   4/2002
CN    1732474 A    2/2006
(Continued)

OTHER PUBLICATIONS

International Search Report for PCT/CN2024/096060 mailed Oct. 17, 2024.
(Continued)

*Primary Examiner* — Brian W Jennison
(74) *Attorney, Agent, or Firm* — Ladas & Parry, LLP (57) ABSTRACT

A welding quality detection system includes: an image acquisition apparatus, a transmission apparatus, a controller, and a processor. The image acquisition apparatus is configured to acquire a first image of a first welding part of a to-be-detected product. The transmission apparatus is configured to move the to-be-detected product or the image acquisition apparatus to a new position. The image acquisition apparatus is configured to acquire, a second image of a second welding part of the to-be-detected product. The controller is configured to indicate the processor to analyze the first image and the second image. The processor is configured to analyze, according to the controller, the first image and the second image at least partially in parallel with the movement of the to-be-detected product or the image acquisition apparatus to the new position, to determine (Continued)

welding quality of the first welding part and welding quality of the second welding part.

20 Claims, 6 Drawing Sheets

(56) References Cited

U.S. PATENT DOCUMENTS

| | | | | |
|---|---|---|---|---|
| 11,878,364 | B2* | 1/2024 | Chen | B23K 20/26 |
| 2004/0120570 | A1* | 6/2004 | Levi | G01N 21/95607 |
| | | | | 382/145 |
| 2020/0376605 | A1* | 12/2020 | Seo | B23K 11/115 |
| 2024/0082963 | A1* | 3/2024 | Kariat | B23K 9/167 |

FOREIGN PATENT DOCUMENTS

| | | |
|---|---|---|
| CN | 103106392 A | 5/2013 |
| CN | 106546597 A | 3/2017 |
| CN | 113899745 A | 1/2022 |
| CN | 218067676 U | 12/2022 |
| CN | 116539626 A | 8/2023 |
| CN | 116908197 A | 10/2023 |
| CN | 117147574 A | 12/2023 |
| CN | 117705813 A | 3/2024 |
| WO | 2017/050924 A1 | 3/2017 |

OTHER PUBLICATIONS

Written Opinion for PCT/CN2024/096060 Oct. 17, 2024.
CNOA for Request for Fast Pre-examination for YS03820241000237 Feb. 1, 2024.
First Office Opinion Notice CN application 202410161178.8 dated Mar. 20, 2024.
Notice of Grant of Invention Patent Right for CN application 202410161178.8 dated Apr. 4, 2024.

* cited by examiner

WELDING QUALITY DETECTION SYSTEM AND METHOD

CROSS-REFERENCE TO RELATED APPLICATIONS

This application is a continuation of International application PCT/CN2024/096060 filed on May 29, 2024 that claims priority to Chinese application No. 202410161178.8 filed on Feb. 5, 2024. The content of these applications is hereby incorporated herein by reference in its entirety.

TECHNICAL FIELD

The present disclosure relates to industrial control technologies, and in particular, to a welding quality detection system and method.

BACKGROUND

A plurality of processes in a battery production procedure relate to welding. Using a power battery as an example, common welding methods in a production process of the power battery include spot welding, pull welding, ultrasonic welding, laser welding, and the like. Welding quality easily deteriorates due to impact of the welding methods, welding parameters, and materials, causing bad welding situations such as crack welding, missed welding, burst points, and welding pits. Detection of the welding quality is a very important link during battery production, and affects various aspects such as efficiency, service life, and stability of the battery.

To detect the welding quality, an image at a welding position may be acquired and may be processed and analyzed, to determine whether the welding quality of the battery is qualified. However, image acquisition, image processing and analysis, and final determining of the welding quality all require time. If the design of the welding quality detection process is improper, an original production beat of a battery production line is disrupted, and production efficiency is reduced. Therefore, how to properly arrange a process of detecting the welding quality to improve the production efficiency is a problem that needs to be resolved urgently.

SUMMARY

To properly arrange a process of detecting welding quality and improve production efficiency, embodiments of the present disclosure provide the following technical solutions.

According to an aspect of the embodiments of the present disclosure, a welding quality detection system is provided. The welding quality detection system is applied to a battery production line, and includes: a transmission apparatus, an image acquisition apparatus, a controller, and a processor. The controller is communicatively connected to the transmission apparatus, the image acquisition apparatus, and the processor. The image acquisition apparatus is configured to acquire a first image of a first welding part of a to-be-detected product. The transmission apparatus is configured to move the to-be-detected product or the image acquisition apparatus to a new position in response to ending of the acquisition of the first image, where a second welding part of the to-be-detected product is located within an acquisition field of view of the image acquisition apparatus at the new position. The image acquisition apparatus is further configured to acquire, at the new position, a second image of the second welding part of the to-be-detected product. The controller is configured to indicate the processor to analyze the first image, and indicate the processor to analyze the second image. The processor is configured to analyze, according to the indication of the controller, the first image at least partially in parallel with the movement of the to-be-detected product or the image acquisition apparatus to the new position, to determine welding quality of the first welding part, and analyze the second image, to determine welding quality of the second welding part. The controller is further configured to determine a detection result of the to-be-detected product at least partially based on the welding quality of the first welding part and the welding quality of the second welding part.

In some embodiments, the controller is further configured to receive, when the acquisition of the first image ends, an acquisition ending indication from the image acquisition apparatus, and control, in response to the acquisition ending indication, the transmission apparatus to move the to-be-detected product or the image acquisition apparatus to the new position.

In some embodiments, the welding quality detection system further includes: a first transmission apparatus, configured to move the to-be-detected product to a first position before the image acquisition apparatus acquires the first image, where the first welding part is located within the acquisition field of view of the image acquisition apparatus at the first position. The controller is further configured to receive a first moved-into-position indication in response to the to-be-detected product having been moved to the first position, and control, in response to the first moved-into-position indication, the image acquisition apparatus to start acquiring the first image.

In some embodiments, the image acquisition apparatus is further configured to acquire the second image of the second welding part in response to the to-be-detected product or the image acquisition apparatus being moved to the new position.

In some embodiments, the controller is further configured to receive a second moved-into-position indication in response to the to-be-detected product or the image acquisition apparatus having been moved to the new position, and control, in response to the second moved-into-position indication, the image acquisition apparatus to start acquiring the second image.

In some embodiments, the welding quality detection system further includes: a second transmission apparatus, configured to move the to-be-detected product to a second position in response to the image acquisition apparatus completing image acquisition of all to-be-detected welding parts of the to-be-detected product, where the to-be-detected product is kept at the second position until the detection result is determined.

In some embodiments, the welding quality detection system further includes: a third transmission apparatus, configured to move the to-be-detected product from the second position to a next procedure or a waste discharge station based on the determined detection result.

In some embodiments, the to-be-detected product is a battery cell. The battery cell includes a top cover and a shell. The first welding part and the second welding part respectively include one or more pre-welding points between the top cover and the shell.

In some embodiments, a distribution pattern of pre-welding points of the first welding part is the same as a distribution pattern of pre-welding points of the second welding part, or the distribution pattern of the pre-welding points of the first welding part is a subset of the distribution pattern of the pre-welding points of the second welding part.

In some embodiments, there are a plurality of image acquisition apparatuses. Acquisition fields of view of the image acquisition apparatuses are distributed according to the distribution pattern of the pre-welding points of the first welding part.

In some embodiments, the transmission apparatus is further configured to move the to-be-detected product or the image acquisition apparatus to a second new position in response to ending of the acquisition of the second image, where a third welding part of the to-be-detected product is located within the acquisition field of view of the image acquisition apparatus at the second new position. The image acquisition apparatus is further configured to acquire a third image of the third welding part of the to-be-detected product at the second new position. The controller is further configured to indicate the processor to analyze the third image. The processor is further configured to analyze the third image, to determine welding quality of the third welding part. The controller is further configured to determine the detection result of the to-be-detected product at least partially based on the welding quality of the first welding part, the welding quality of the second welding part, and the welding quality of the third welding part.

In some embodiments, the first welding part, the second welding part, and the third welding part are equally spaced.

According to another aspect of the embodiments of the present disclosure, a welding quality detection method, applied to a welding quality detection system of a battery production line, is provided. The welding quality detection system includes a controller, a processor, an image acquisition apparatus, and a transmission apparatus. The method includes: The image acquisition apparatus acquires a first image of a first welding part of a to-be-detected product. The transmission apparatus moves the to-be-detected product or the image acquisition apparatus to a new position in response to ending of the acquisition of the first image, where a second welding part of the to-be-detected product is located within an acquisition field of view of the image acquisition apparatus at the new position. The image acquisition apparatus acquires, at the new position, a second image of the second welding part of the to-be-detected product. The processor analyzes the first image according to an indication of the controller, to determine welding quality of the first welding part. The processor analyzes the second image according to the indication of the controller, to determine welding quality of the second welding part. And the controller determines a detection result of the to-be-detected product at least partially based on the welding quality of the first welding part and the welding quality of the second welding part, where the analyzing the first image and the moving the to-be-detected product or the image acquisition apparatus to the new position are at least partially performed in parallel.

In some embodiments, that the transmission apparatus moves the to-be-detected product or the image acquisition apparatus to a new position in response to ending of the acquisition of the first image includes: The controller receives an acquisition ending indication when the acquisition of the first image ends. The controller controls, in response to the acquisition ending indication, the transmission apparatus to start moving the to-be-detected product or the image acquisition apparatus.

In some embodiments, the welding quality detection method further includes: moving the to-be-detected product to a first position before the first image is acquired, where the first welding part is located within the acquisition field of view of the image acquisition apparatus at the first position. The controller receives a first moved-into-position indication in response to the to-be-detected product having been moved to the first position. That the image acquisition apparatus acquires a first image of a first welding part of a to-be-detected product includes: The controller controls, in response to the first moved-into-position indication, the image acquisition apparatus to start acquiring the first image.

In some embodiments, that the image acquisition apparatus acquires, at the new position, a second image of the second welding part of the to-be-detected product includes: The image acquisition apparatus acquires the second image of the second welding part in response to the to-be-detected product or the image acquisition apparatus being moved to the new position.

In some embodiments, that the image acquisition apparatus acquires the second image of the second welding part in response to the to-be-detected product or the image acquisition apparatus being moved to the new position includes: The controller receives a second moved-into-position indication in response to the to-be-detected product or the image acquisition apparatus having been moved to the new position. The controller controls, in response to the second moved-into-position indication, the image acquisition apparatus to start acquiring the second image.

In some embodiments, the welding quality detection method further includes: moving the to-be-detected product to a second position in response to the image acquisition apparatus completing image acquisition of all to-be-detected welding parts of the to-be-detected product; and keeping the to-be-detected product at the second position until the detection result is determined.

In some embodiments, the welding quality detection method further includes: moving the to-be-detected product from the second position to a next procedure or a waste discharge station based on the determined detection result.

In some embodiments, the analysis of the first image and the movement of the to-be-detected product or the image acquisition apparatus to the new position are simultaneously performed.

In some embodiments, the analysis of the second image is performed after the analysis of the first image is completed.

In some embodiments, the to-be-detected product is a battery cell. The battery cell includes a top cover and a shell. The first welding part and the second welding part respectively include one or more pre-welding points between the top cover and the shell.

In some embodiments, a distribution pattern of pre-welding points of the first welding part is the same as a distribution pattern of pre-welding points of the second welding part.

In some embodiments, the distribution pattern of the pre-welding points of the second welding part is a subset of the distribution pattern of the pre-welding points of the first welding part.

In some embodiments, there are a plurality of image acquisition apparatuses. Acquisition fields of view of the image acquisition apparatuses are distributed according to the distribution pattern of the pre-welding points of the first welding part.

In some embodiments, the welding quality detection method further includes: The transmission apparatus moves the to-be-detected product or the image acquisition apparatus to a second new position in response to ending of the acquisition of the second image, where a third welding part of the to-be-detected product is located within the acquisition field of view of the image acquisition apparatus at the second new position. The image acquisition apparatus acquires, at the second new position, a third image of the third welding part of the to-be-detected product at the second new position.

The processor analyzes the third image according to the indication of the controller, to determine welding quality of the third welding part. That the controller determines a detection result of the to-be-detected product at least partially based on the welding quality of the first welding part and the welding quality of the second welding part includes: The controller determines the detection result of the to-be-detected product at least partially based on the welding quality of the first welding part, the welding quality of the second welding part, and the welding quality of the third welding part.

In some embodiments, the first welding part, the second welding part, and the third welding part are equally spaced.

In the embodiments of the present disclosure, by adjusting a detection rhythm of the welding quality detection system on the battery production line, the controller is enabled to separately control movement and image analysis of the image acquisition apparatus or the to-be-detected product in an image acquisition process, so that the movement and the analysis are performed at least partially in parallel, thereby optimizing a detection process of the welding quality detection system on the battery production line, saving detection time, improving detection efficiency, ensuring completion of a welding quality detection task within a specified detection time without increasing a quantity of cameras, and controlling costs of the welding quality detection system.

Hereinafter, the technical solutions of the present disclosure will be further described in detail with reference to the accompanying drawings and embodiments.

BRIEF DESCRIPTION OF THE DRAWINGS

In order to more clearly explain the technical solutions in the embodiments of the present disclosure or the related art, the accompanying drawings that need to be used in the description of the embodiments or the related art will be briefly introduced below. It is apparent that the accompanying drawings in the following description are only some embodiments of the present disclosure. For a person of ordinary skill in the art, other accompanying drawings may be obtained from these accompanying drawings without making creative labor.

DETAILED DESCRIPTION

The following clearly and completely describes the technical solutions in the embodiments of the present disclosure with reference to the accompanying drawings in the embodiments of the present disclosure. It is apparent that the described embodiments are merely some embodiments of the present disclosure, but not all the embodiments. All other embodiments obtained by a person of ordinary skill in the art based on the embodiments of the present disclosure without making creative labor shall fall within the protection scope of the present disclosure.

Unless otherwise specifically stated, relative arrangements of components and steps, numerical expressions, and numerical values described in these embodiments do not limit the scope of the present disclosure.

In addition, it should be understood that for ease of description, the sizes of parts shown in the accompanying drawings are not drawn according to an actual proportional relationship.

Technologies, methods, and devices known by a person of ordinary skill in the related art may not be discussed in detail, but in proper circumstances, the technologies, methods, and devices should be considered as a part of the specification.

In all examples shown and discussed herein, any specific value should be interpreted as merely an example, rather than a limitation. Therefore, other examples of exemplary embodiments may have different values.

It should be noted that similar numbers and letters represent similar items in the following accompanying drawings. Therefore, once an item is defined in one of the accompanying drawings, the item does not need to be further discussed in subsequent accompanying drawings.

As described above, in a battery production line (which is referred to as "production line" for short below), to reduce impact on an original production beat, time for detecting welding quality is very limited. If a to-be-detected product has a plurality of welding parts to be detected, a time requirement for detecting the welding quality is larger.

A solution is to increase a quantity of image acquisition apparatuses for acquiring images of welding parts, and to allow the plurality of image acquisition apparatuses to acquire and process the images in parallel. However, costs may be increased by adding the image acquisition apparatuses. In addition, when there are a relatively large quantity of welding parts, it is difficult to add so many image acquisition apparatuses in reality. In addition, when the welding parts are relatively dense, there may be insufficient space around the to-be-detected product to place the plurality of image acquisition apparatuses at a short distance. Therefore, there is still a need to successively detect at least two welding parts by using one image acquisition apparatus. A detection process in this scenario needs to be optimally designed, to satisfy a production beat requirement of the production line and ensure production efficiency.

In the related art, for a case that a same image acquisition apparatus detects a plurality of welding parts, the welding parts are generally processed in a serial manner one by one. To be specific, the image acquisition apparatus first performs image acquisition and image analysis on one welding part, and then the image acquisition apparatus continues to perform image acquisition and image analysis on a next welding part. The detection process needs to consume a relatively long time, and is difficult to adapt to a requirement of the rapid production beat.

Embodiments of the present disclosure provide a solution in which detection processes for different welding parts are performed partially in parallel to shorten an overall detection time. Specifically, after the image acquisition apparatus completes acquiring an image of a current welding part, a process of aligning the image acquisition apparatus with the next welding part and a process of processing the image of the current welding part are performed partially in parallel.

For ease of understanding the solution, a welding quality detection system according to an embodiment of the present disclosure is first described. The welding quality detection system may be applied to a battery production line.

Figure 1:
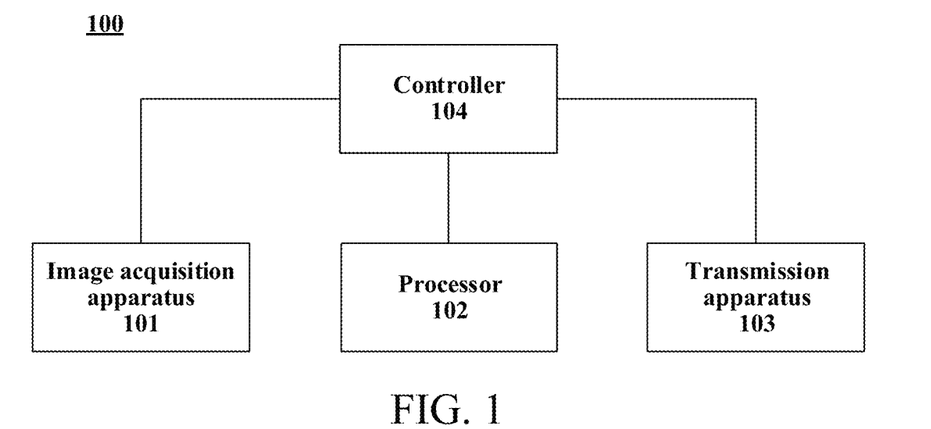
FIG. 1 is a schematic composition diagram of a welding quality detection system 100 according to some embodiments of the present disclosure.

FIG. 1 is a schematic composition diagram of a welding quality detection system 100 according to some embodiments of the present disclosure. The welding quality detection system 100 (which is referred to as the system 100 for short below) includes an image acquisition apparatus 101, a processor 102, a transmission apparatus 103, and a controller 104. The system 100 may be configured to detect welding quality of a welding part on a to-be-detected product (not shown). The to-be-detected product includes, but is not limited to, a battery cell, a module, a battery pack, or a battery product. The to-be-detected product may include at least two welding parts. The welding part refers to a position processed by a welding process on the to-be-detected product. The welding process includes, but is not limited to, spot welding, pull welding, ultrasonic welding, and laser welding. The welding part may be a welding point, a welding pad, or any other welding pattern.

The image acquisition apparatus 101 is configured to acquire an image, namely, take a picture, of the welding part on the to-be-detected product. The image acquisition apparatus 101 may include a charge-coupled device (CCD) camera, a complementary metal-oxide-semiconductor (CMOS) camera, and a charge injection device (CID) camera. The image acquisition apparatus 101 may photograph one or more welding parts at a time according to a size of an acquisition field of view thereof, or a combination of a plurality of image acquisition apparatuses 101 may photograph different portions of one welding parts at a time. The acquisition field of view of the image acquisition apparatus 101 is a maximum range that can be photographed by the image acquisition apparatus 101.

Because the size of the acquisition field of view of the image acquisition apparatus 101 is limited, to acquire a high-definition image to ensure detection accuracy, when the image acquisition apparatus 101 cannot photograph all of the welding parts of the to-be-detected product at a time, the image acquisition apparatus 101 or the to-be-detected product needs to be moved, so that the welding parts or a portion of the welding parts originally located outside the acquisition field of view is moved into the acquisition field of view.

Figure 2:
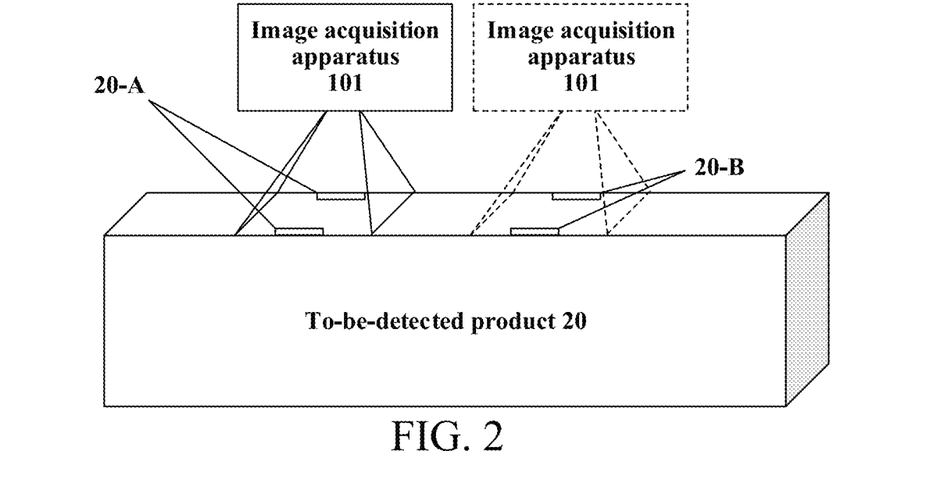
FIG. 2 is a schematic diagram of an acquisition field of view of an image acquisition apparatus and a welding part of a to-be-detected product according to some embodiments of the present disclosure.

FIG. 2 is a schematic diagram of a welding part between an acquisition field of view of an image acquisition apparatus and a to-be-detected product according to some embodiments of the present disclosure. As shown in FIG. 2, the image acquisition apparatus 101 is first aimed with a welding part 20-A of a to-be-detected product 20, and the welding part 20-B is located outside an acquisition field of view (shown by a solid line in the figure) of the image acquisition apparatus 101. To acquire an image of the welding part 20-B, the image acquisition apparatus 101 or the to-be-detected product 20 needs to be moved, so that the welding part 20-B is located within the acquisition field of view of the image acquisition apparatus 101 (the moved image acquisition apparatus 101 is shown in the figure, and the acquisition field of view after movement is shown by using a dashed line).

Referring to FIG. 1, the processor 102 is configured to receive an acquired image of a welding part from the image acquisition apparatus 101, and perform image recognition on the image, to detect welding quality of the corresponding welding part in the image. The processor 102 may include a central processing unit (CPU), a graphics processing unit (GPU), and software stored in a related memory. The processor 102 implements functions of image receiving and image recognition detection by executing software instructions.

The transmission apparatus 103 is configured to move a to-be-detected product (such as a battery cell, a module, a battery pack, or a finished battery product) or the image acquisition apparatus 101, so that the image acquisition apparatus 101 may be aligned with a specific welding part on the to-be-detected product.

In some embodiments, the transmission apparatus 103 is configured to move the to-be-detected product, and the image acquisition apparatus 101 does not move. The transmission apparatus 103 includes a conveyor belt, a track, a mechanical arm, and the like. The to-be-detected product moves with the conveyor belt, the track, the mechanical arm, and the like of the battery production line. The to-be-detected product is first moved to a first position by the transmission apparatus, so that the acquisition field of view of the image acquisition apparatus 101 may be aligned with a welding part A of the to-be-detected product, and an image of the welding part A is acquired. The to-be-detected product is then moved to a second position, so that the acquisition field of view of the image acquisition apparatus may be aligned with a welding part B of the to-be-detected product, and an image of the welding part B is acquired. The rest can be deduced by analogy, until image acquisition of all the welding parts of the to-be-detected product is completed.

In some other embodiments, the transmission apparatus 103 is configured to move the image acquisition apparatus 101. Once the to-be-detected product enters an initial detection region, the position is no longer moved. The transmission apparatus 103 includes a mechanical arm, a track, and the like. The image acquisition apparatus 101 moves with the mechanical arm, the track, and the like. Similar to the movement of the to-be-detected product, the image acquisition apparatus 101 is first moved by the transmission apparatus to a third position, so that the acquisition field of view thereof may be aligned with the welding part A of the to-be-detected product, and an image is acquired. Then, the apparatus is moved to a fourth position, so that the acquisition field of view thereof may be aligned with the welding part B of the to-be-detected product, and an image of the welding part B is acquired. The rest can be deduced by analogy, until image acquisition of all the welding parts of the to-be-detected product is completed.

In the foregoing embodiment, the movement includes translation, rotation, or another movement manner.

The controller 104 is communicatively coupled to the processor 102. The controller 104 transmits an instruction to the processor 102, to instruct the processor to analyze the acquired image of the welding part and determine welding quality. The controller 104 may further integrate the welding quality determined according to the acquired images of the plurality of welding parts, to determine a final detection result of the to-be-detected product. In some embodiments, the controller 104 may further be communicatively coupled to the transmission apparatus 103, to control the transmission apparatus 103 to move the to-be-detected product or the image acquisition apparatus 101. In some embodiments, the controller 104 may further be communicatively coupled to the image acquisition apparatus 101, to control the image acquisition apparatus 101 to start acquiring an image of a specific welding part.

The following describes a welding part of a to-be-detected product in some embodiments of the present disclosure by using quality detection of pre-welding of a battery cell on a battery production line as an example.

Figure 3:
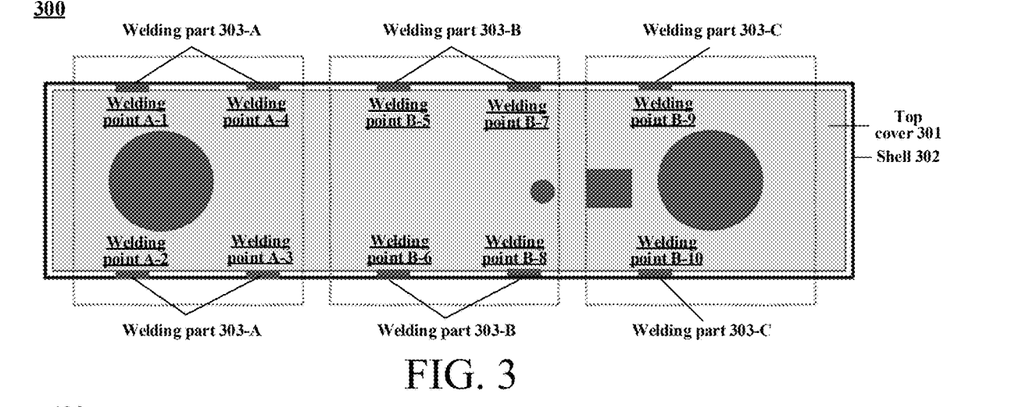
FIG. 3 is a schematic diagram of a plurality of welding parts between a top cover and a shell of a battery cell according to some embodiments of the present disclosure.

FIG. 3 is a schematic diagram of a plurality of welding parts between a top cover and a shell of a battery cell according to some embodiments of the present disclosure.

In some embodiments, as shown in FIG. 3, a battery cell 300 includes a top cover 301 and a shell 302. A first welding part and a second welding part respectively include one or more pre-welding points between the top cover 301 and the shell 302. For example, the first welding part is a welding part 303-A, and the second welding part is a welding part 303-B. The welding part 303-A includes four pre-welding points (a welding point A-1 to a welding point A-4 shown in FIG. 3). Images of the four pre-welding points may be acquired by one or more image acquisition apparatuses at a time. The welding part 303-B includes four pre-welding points (a welding point B-5 to a welding point B-8 shown in FIG. 3). Images of the four pre-welding points may be acquired by one or more image acquisition apparatuses at a time likewise. Before the top cover 301 and the shell 302 of the battery are completely welded, the top cover 301 and the shell 302 are first connected together by means of pre-welding, so that stability of a welding process can be improved. The welding quality of the pre-welding points directly affects the quality of the battery cell 300. Therefore, the welding quality of the pre-welding points of each welding part needs to be detected.

A quantity of pre-welding points included in each welding part may be equal, or may be different. For example, the battery cell 300 has 10 pre-welding points in total. The welding part 303-A includes four pre-welding points (a welding point A-1, a welding point A-2, a welding point A-3, and a welding point A-4 shown in FIG. 3). The welding part 303-B includes four pre-welding points (a welding point B-5, a welding point B-6, a welding point B-7, and a welding point B-8). The welding part 303-C includes two pre-welding points (a welding point C-9 and a welding point C-10).

In some embodiments, a distribution pattern of pre-welding points of the first welding part is the same as a distribution pattern of pre-welding points of the second welding part. For example, as shown in FIG. 3, the welding part 303-A is a first welding part, and the welding part 303-B is a second welding part. Both the welding part 303-A and the welding part 303-B include four pre-welding points, and a distribution pattern of the welding part A-1 to the welding part A-4 is the same as that of the welding part B-5 to the welding part B-8.

In some other embodiments, the distribution pattern of the pre-welding points of the second welding part is a subset of the distribution pattern of the pre-welding points of the first welding part. For example, the welding part 303-A shown in FIG. 3 is a first welding part, and the welding part 303-C is a second welding part. The welding part 303-A includes a welding part A-1 to a welding part A-4. The welding part 303-C includes a welding part C-9 and a welding part C-10. A distribution pattern of the welding part C-9 and the welding part C-10 is a subset of a distribution pattern of the welding part A-1 to the welding part A-4.

Distribution of the pre-welding points of the welding parts follows a same distribution rule, to assist the image acquisition apparatus 101 in more conveniently acquiring images of the welding parts. For example, when an image of each welding part is acquired by one image acquisition apparatus 101, a position of a pre-welding point of each welding part in a corresponding image can be determined more conveniently, which helps to improve image analysis efficiency of the processor 102.

In addition, in some embodiments, there are a plurality of image acquisition apparatuses 101. Acquisition fields of view of the image acquisition apparatuses 101 are distributed according to the distribution pattern of the pre-welding points of the first welding part. In the foregoing manner, no matter the distribution pattern of the pre-welding points of the first welding part is the same as the distribution pattern of the pre-welding points of the second welding part, or the distribution pattern of the pre-welding points of the second welding part is a subset of the distribution pattern of the pre-welding points of the first welding part, when images at different welding parts are acquired, only positions of a plurality of image acquisition apparatuses 101 need to be adjusted together, and acquisition fields of view of the image acquisition apparatuses 101 do not need to be adjusted to be aligned with the welding parts of the to-be-detected product one by one, thereby helping to improve image acquisition efficiency.

For example, as shown in FIG. 3, the first welding part is the welding part 303-A, and the second welding part is the welding part 303-C. There are four image acquisition apparatuses, and acquisition fields of view of the four image acquisition apparatuses are distributed according to a distribution pattern of the welding point A-1 to the welding point A-4 of the welding part 303-A. If relative positions of the four image acquisition apparatuses do not need to be adjusted, the acquisition fields of view thereof may acquire images of the welding point A-1 to the welding point A-4 of the part 303-A. Because the welding point C-9 and the welding point C-10 are distributed the same as those of the welding point A-1 and the welding point A-2, images of the welding point C-9 and the welding point C-10 of the part 303-C may be acquired. In this way, images of a plurality of welding parts can be acquired more quickly.

A mutual relationship of the components in the system 100, a function that can be implemented by each component, and a to-be-detected object for welding quality detection have been described above in detail, and some embodiments in which the battery cell 300 is used as the to-be-detected object are listed. A welding quality detection method according to some embodiments of the present disclosure is described below with reference to FIG. 4 to FIG. 7.

Figure 4:
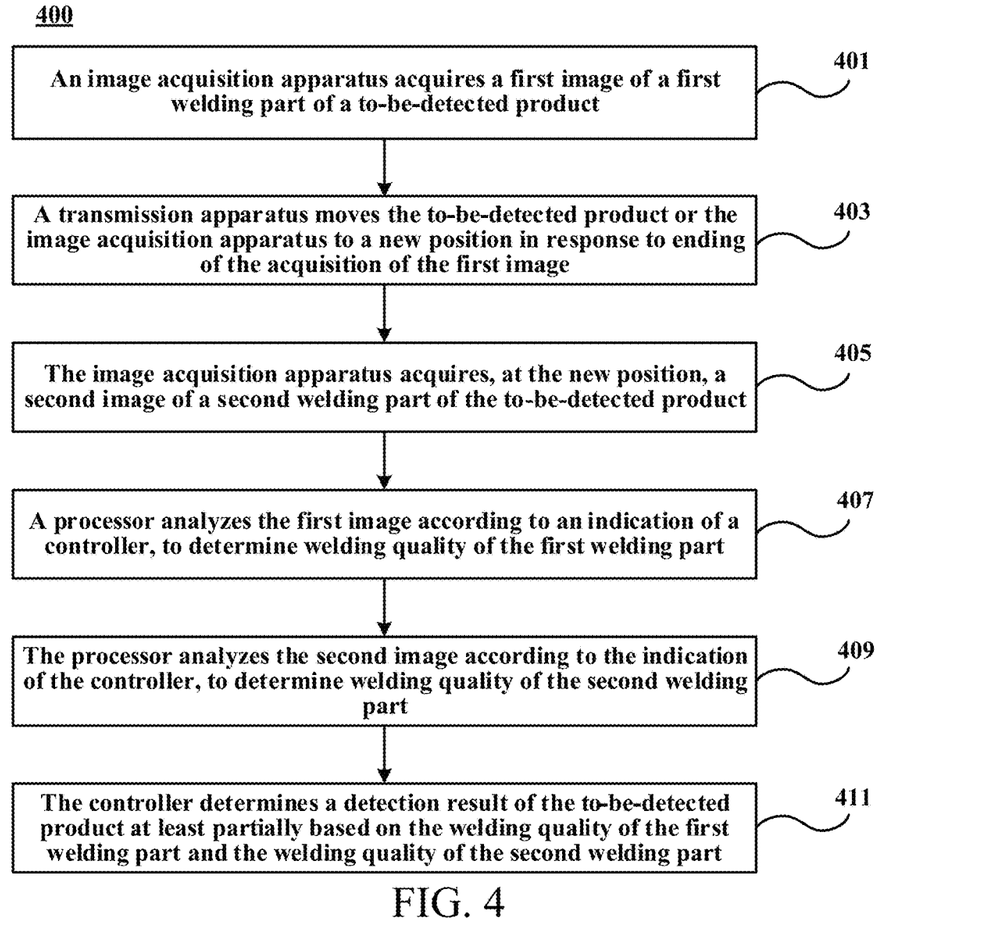
FIG. 4 is a schematic flowchart of a welding quality detection method 400 according to some embodiments of the present disclosure.

FIG. 4 is a schematic flowchart of a welding quality detection method 400 according to some embodiments of the present disclosure. The welding quality detection method 400 (which is referred to as the method 400 for short below) may be performed by the system 100 shown in FIG. 1. The method 400 may be used for detecting welding quality of pre-welding of the battery cell 300 shown in FIG. 3.

In step 401, the image acquisition apparatus 101 acquires a first image of a first welding part of a to-be-detected product.

The to-be-detected product may not be located at a first position initially, but at another position (for example, a position at which a previous production link of a battery production line is completed). As a result, the first welding part of the to-be-detected product is out of an acquisition field of view of the image acquisition apparatus 101. In this case, before the first image is acquired, a relative position between the image acquisition apparatus 101 and the to-be-detected product may be adjusted by using the following method, so that the acquisition field of view of the image acquisition apparatus 101 is aligned with the first welding part.

In some embodiments, the welding quality detection method 400 further includes: move the to-be-detected product to the first position before the first image is acquired, where the first welding part is located within the acquisition field of view of the image acquisition apparatus 101 at the first position. The controller 104 receives a first moved-into-position indication in response to the to-be-detected product having been moved to the first position. Step 401 includes: The controller 104 controls, in response to the first moved-into-position indication, the image acquisition apparatus to start acquiring the first image. The first moved-into-position indication may be transmitted by the image acquisition apparatus 101 to the controller 104 in response to the first welding part entering the acquisition field of view or the first welding part moving to a first preset position in the acquisition field of view, or may be transmitted by a sensor to the controller 104 when the sensor senses that the to-be-detected product is moved to the first position, or may be transmitted, by a first transmission apparatus configured to move the to-be-detected product to the first position, to the controller 104 after the first transmission apparatus completes moving the to-be-detected product to the first position. The first transmission apparatus may be the transmission apparatus 103, or may be another transmission apparatus other than the transmission apparatus 103.

In some embodiments, the image acquisition apparatus 101 may alternatively directly start acquiring the first image in response to the first welding part entering the acquisition field of view or the first welding part moving to the first preset position in the acquisition field of view, instead of being indicated by the controller 104. Alternatively, the image acquisition apparatus 101 starts acquiring the first image in response to receiving an indication transmitted by the sensor or the first transmission apparatus.

In the foregoing embodiment, the to-be-detected product is moved to the first position, so that the first welding part of the to-be-detected product is located within the acquisition field of view of the image acquisition apparatus 101, to assist the image acquisition apparatus 101 in acquiring the first image, and ensure that the first image can clearly reflect the welding quality of the first welding part, thereby helping to improve the accuracy of welding quality detection.

In step 403, the transmission apparatus 103 moves the to-be-detected product or the image acquisition apparatus 101 to a new position in response to ending of the acquisition of the first image. A second welding part of the to-be-detected product is located within the acquisition field of view of the image acquisition apparatus 101 at the new position.

As described above for the transmission apparatus 103, the transmission apparatus 103 may move the to-be-detected product, but the image acquisition apparatus 101 is not moved. Before the acquisition of the first image ends, the to-be-detected product is located at the first position. The first welding part is located within the acquisition field of view of the image acquisition apparatus 101 at the first position. In response to ending of the acquisition of the first image, the transmission apparatus 103 moves the to-be-detected product from the first position to the new position, so that the second welding part is located within the acquisition field of view of the image acquisition apparatus 101.

The transmission apparatus 103 may alternatively move the image acquisition apparatus 101, and the to-be-detected product is fixed at the first position and is not moved. In response to ending of the acquisition of the first image, the transmission apparatus 103 moves the image acquisition apparatus 101 to a new position, and the acquisition field of view moves with the movement of the image acquisition apparatus 101, to convert from covering the first welding part of the to-be-detected product to covering the second welding part.

The foregoing two manners can both assist the image acquisition apparatus 101 in acquiring a second image of the second welding part in subsequent steps.

In some embodiments, step 403 includes: The controller 104 receives an acquisition ending indication when the acquisition of the first image ends. The controller 104 controls, in response to the acquisition ending indication, the transmission apparatus 103 to start moving the to-be-detected product or the image acquisition apparatus 101. The acquisition ending indication may be transmitted by the image acquisition apparatus 101 to the controller 104 in response to ending of the acquisition of the first image, or may be transmitted by the controller 104 over a specific acquisition time period after the acquisition of the first image starts.

The foregoing manner can avoid a case in which quality of the first image is affected when the to-be-detected product or the image acquisition apparatus 101 is moved when the acquisition of the first image is not completed, thereby helping to improve accuracy of a welding quality detection result.

In step 405, the image acquisition apparatus 101 acquires, at the new position, the second image of the second welding part of the to-be-detected product. Regardless of whether the image acquisition apparatus 101 or the to-be-detected product is moved to the new position, the second image of the second welding part may be acquired. The second image may start to be acquired immediately after the image acquisition apparatus 101 or the to-be-detected product arrives at the new position, or may start to be acquired at a moment after the image acquisition apparatus 101 or the to-be-detected product arrives at the new position.

In some embodiments, step 405 includes: The image acquisition apparatus 101 acquires the second image of the second welding part in response to the to-be-detected product or the image acquisition apparatus being moved to the new position. To be specific, the second image starts to be acquired immediately after the image acquisition apparatus 101 or the to-be-detected product is moved to the new position.

In some embodiments, that the image acquisition apparatus 101 acquires the second image of the second welding part in response to the to-be-detected product or the image acquisition apparatus 101 being moved to the new position includes: The controller 104 receives a second moved-into-position indication in response to the to-be-detected product or the image acquisition apparatus 101 having been moved to the new position. The controller 104 controls, in response to the second moved-into-position indication, the image acquisition apparatus 101 to start acquiring the second image.

Similar to the first moved-into-position indication, the second moved-into-position indication may be transmitted by the image acquisition apparatus 101 to the controller 104 in response to the second welding part entering the acquisition field of view or the second welding part moving to the first preset position in the acquisition field of view, or may be transmitted by a sensor to the controller 104 when the sensor senses that the to-be-detected product or the image acquisition apparatus 101 is moved to the new position, or may be transmitted, by a second transmission apparatus configured to move the to-be-detected product or the image acquisition apparatus 101 to the new position, to the controller 104 after second transmission apparatus completes moving the to-be-detected product or the image acquisition apparatus 101 to the new position. The second transmission apparatus may be the transmission apparatus 103, or may be another transmission apparatus other than the transmission apparatus 103. The second transmission apparatus and the first transmission apparatus may be a same transmission apparatus, or may be different transmission apparatuses. The second moved-into-position indication can avoid a case in which quality of the second image is affected when the transmission apparatus 103 moves the to-be-detected product or the image acquisition apparatus 101 when the acquisition of the second image is not completed, thereby further helping to improve accuracy of welding quality detection.

In step 407, the processor 102 analyzes the first image according to the indication of the controller 104, to determine welding quality of the first welding part. The welding quality of the welding part may be classified into qualified and unqualified, or may be classified into a plurality of levels according to requirements, for example, excellent, good, medium, and poor. The processor 102 may analyze the first image by using software having an image analysis function to obtain a level of the welding quality of the first welding part.

In step 409, the processor 102 analyzes the second image according to the indication of the controller, to determine welding quality of the second welding part.

In some embodiments, the analysis of the second image (i.e. step 409) is performed after the analysis of the first image (i.e. step 407) is completed. Both the first image and the second image are analyzed by the processor 102. The foregoing manner can avoid a wrong analysis result caused by impact of the second image when the processor 102 analyzes the first image.

In step 411, the controller 104 determines a detection result of the to-be-detected product at least partially based on the welding quality of the first welding part and the welding quality of the second welding part. The analysis of the first image (i.e. step 407) and the movement of the to-be-detected product or the image acquisition apparatus to the new position (i.e. step 403) are at least partially performed in parallel.

In some embodiments, the analysis of the first image (i.e. step 407) and the movement of the to-be-detected product or the image acquisition apparatus 101 to the new position (i.e. step 403) are simultaneously performed. The analysis of the first image by the processor 102 and the movement of the to-be-detected product or the image acquisition apparatus 101 to the new position by the transmission apparatus 103 are two tasks that are performed by two entities independent of each other and that do not affect each other, and executing the tasks in parallel may further help to improve efficiency of welding quality detection.

It may be understood that, in the foregoing embodiment, the to-be-detected product may have more than two welding parts. When the acquisition of the first image of the first welding part is completed, the image acquisition apparatus 101 or the to-be-detected product is moved to the new position, so that the second welding part is located within the acquisition field of view of the image acquisition apparatus 101. The second image of the second welding part is acquired at the new position. The foregoing steps are repeated cyclically, until images of all the welding parts of the to-be-detected product are acquired completely. For example, as shown in FIG. 3, an image of the welding part 303-A (the first welding part) is acquired. When image acquisition of the welding part 303-A is completed, an image of the welding part 303-B (the second welding part) is acquired. The welding part 303-B is a first welding part relative to the welding part 303-C. When image acquisition of the welding part 303-B is completed, an image of the welding part 303-C is acquired. In this case, images of all the welding parts on the battery cell 300 are acquired.

In the foregoing manner, by adjusting a detection rhythm of the welding quality detection system on the battery production line, the controller is enabled to separately control the movement and the image analysis of the image acquisition apparatus or the to-be-detected product in an image acquisition process, so that the movement and the analysis are performed at least partially in parallel, thereby optimizing a detection process of the welding quality detection system on the battery production line, reducing detection time, improving detection efficiency, ensuring completion of a welding quality detection task within a specified detection time without increasing a quantity of cameras, and controlling costs of the welding quality detection system.

It is mentioned in the description of step 405 that the second image may start to be acquired immediately after the image acquisition apparatus 101 or the to-be-detected product arrives at the new position, or may start to be acquired at a moment after the image acquisition apparatus 101 or the to-be-detected product arrives at the new position. Using welding quality detection of the battery cell 300 shown in FIG. 3 as a non-restrictive example below, some embodiments of different moments at which the second image starts to be acquired are described, and the impact of the moments at which the second image starts to be acquired on the welding quality detection process of the to-be-detected product is comparatively analyzed. It should be noted that the detection method in FIG. 4 is also applicable to another to-be-detected product other than the battery cell 300.

For ease of description, in the following embodiment, the transmission apparatus 103 moves the battery cell 300, and the image acquisition apparatus 101 is stationary.

Figure 5:
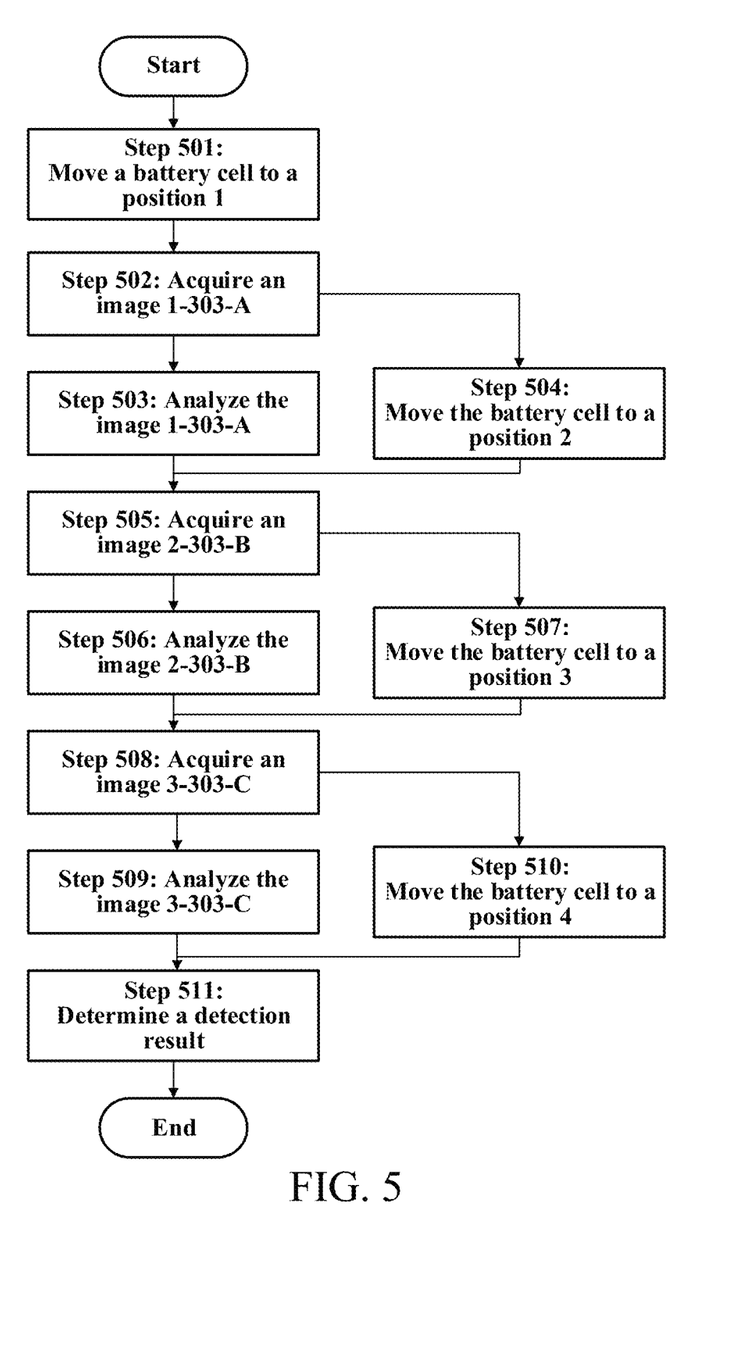
FIG. 5 and FIG. 6 are a time sequence diagram and a flowchart of welding quality detection according to some embodiments of the present disclosure.
Figure 6:
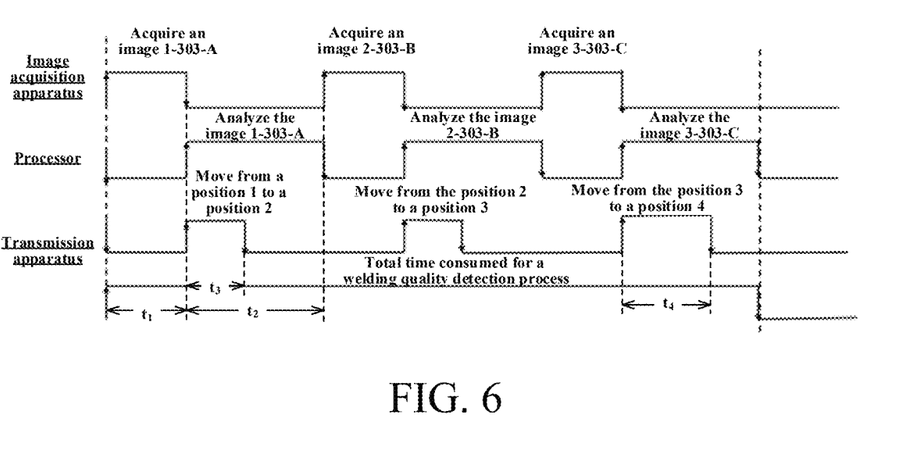

FIG. 5 and FIG. 6 are a time sequence diagram and a flowchart of welding quality detection according to some embodiments of the present disclosure.

In some embodiments, in response to ending of the analysis of the first image, the image acquisition apparatus 101 acquires the second image of the second welding part. In this case, as shown in FIG. 5, when the welding quality of the battery cell 300 is detected, the following steps 501 to 511 are performed.

In step 501, the controller 104 controls the transmission apparatus 103 to move the battery cell 300 to position 1, and the welding part 303-A is located within the acquisition field of view of the image acquisition apparatus 101 at position 1. Step 502 is performed. In some embodiments, the battery cell 300 has been moved to position 1 before detection starts, and step 501 may be omitted. A time sequence diagram shown in FIG. 6 is calculating a consumed time starting from step 502.

In step 502, in response to the battery cell 300 having been moved to position 1, the controller 104 controls the image acquisition apparatus 101 to acquire an image 1-303-A at position 1. After step 502 is performed, steps 503 and 504 are performed at least partially in parallel.

In step 503, the processor 102 analyzes the image 1-303-A according to an indication of the controller 104, to determine welding quality of the welding part 303-A.

In step 504, in response to ending of the acquisition of the image 1-303-A, the transmission apparatus 103 moves the battery cell 300 to position 2. The welding part 303-B of the battery cell 300 is located within the acquisition field of view of the image acquisition apparatus 101 at position 2. After steps 503 and 504 are performed, step 505 is performed.

In step 505, in response to ending of the analysis of the image 1-303-A, the image acquisition apparatus 101 acquires an image 2-303-B of the welding part 303-B. After step 505 is performed, steps 506 and 507 are performed at least partially in parallel.

In step 506, the processor 102 analyzes the image 2-303-B according to an indication of the controller 104, to determine welding quality of the welding part 303-B.

In step 507, in response to ending of the acquisition of the image 2-303-B, the transmission apparatus 103 moves the battery cell 300 to position 3. The welding part 303-C of the battery cell 300 is located within the acquisition field of view of the image acquisition apparatus 101 at position 3. After steps 506 and 507 are performed, step 508 is performed.

In step 508, in response to ending of the analysis of the image 2-303-B, the image acquisition apparatus 101 acquires an image 3-303-C of the welding part 303-C of the battery cell 300. After step 508 is performed, steps 509 and 510 are performed at least partially in parallel.

In step 509, the processor 102 analyzes the image 3-303-C according to an indication of the controller 104, to determine welding quality of the welding part 303-C.

In step 510, in response to the image acquisition apparatus 101 completing image acquisition of all to-be-detected welding parts of the battery cell 300, the battery cell 300 is moved to position 4, and the battery cell 300 is kept at position 4 until the detection result is determined. After step 509 and step 510 are performed, step 511 is performed.

In step 511, the controller 104 determines the detection result of the battery cell 300 at least partially based on the welding quality of the welding part 303-A, the welding quality of the welding part 303-B, and the welding quality of the welding part 303-C.

FIG. 6 shows starting time and ending time of each step performed by the image acquisition apparatus 101, the processor 102, and the transmission apparatus 103 under control of the controller 104 when performing welding quality detection on a pre-welding point of a battery cell 300 based on the steps shown in FIG. 5. Time consumed by the image acquisition apparatus 101 to acquire an image of one welding part is $t_1$. Time consumed by the processor 102 to analyze an image is $t_2$. Time required by the transmission apparatus 103 to move the battery cell 300 from position 1 to position 2 or move the battery cell 300 from position 2 to position 3 is $t_3$, where $t_2 > t_3$. Time required by the transmission apparatus 103 to move the battery cell 300 from position 3 to position 4 is $t_4$.

It can be known according to FIG. 6 that based on the steps shown in FIG. 5, it takes at least $3t_1 + 3t_2$ from the moment of acquiring the image 1-303-A at position 1 to the moment of completing detection on 10 welding points of the battery cell.

In the embodiments of FIG. 5 and FIG. 6, the time t2 consumed by image analysis is long. If the movement of the battery cell 300 and image acquisition are continuously performed, to be specific, the image acquisition apparatus 101 does not need to wait for the processor 102 to acquire the image after analyzing the image, but acquires the image immediately after the battery cell 300 moves to a next position, thereby further shortening time consumed in the entire detection process. The following describes a further improved embodiment with reference to FIG. 7 and FIG. 8.

Figure 7:
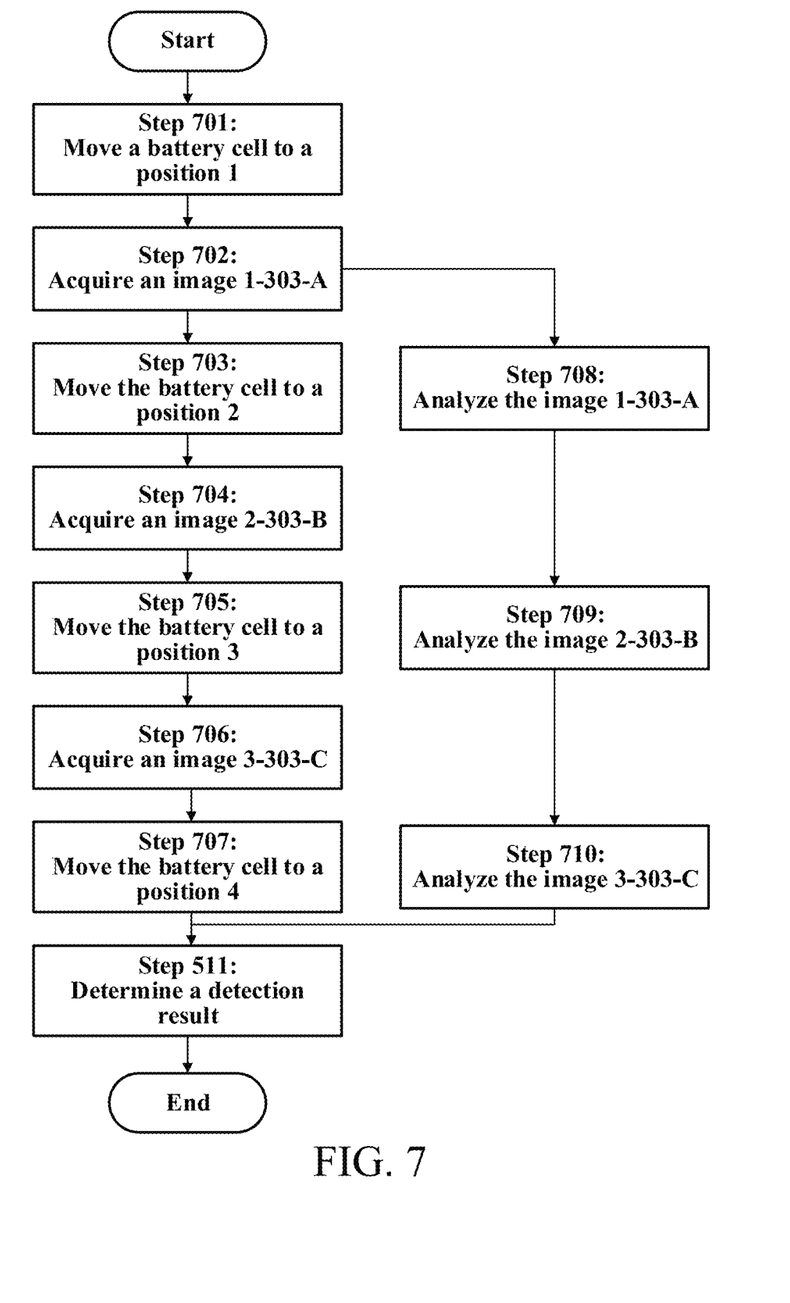
FIG. 7 and FIG. 8 are a time sequence diagram and a flowchart of welding quality detection according to some other embodiments of the present disclosure.
Figure 8:
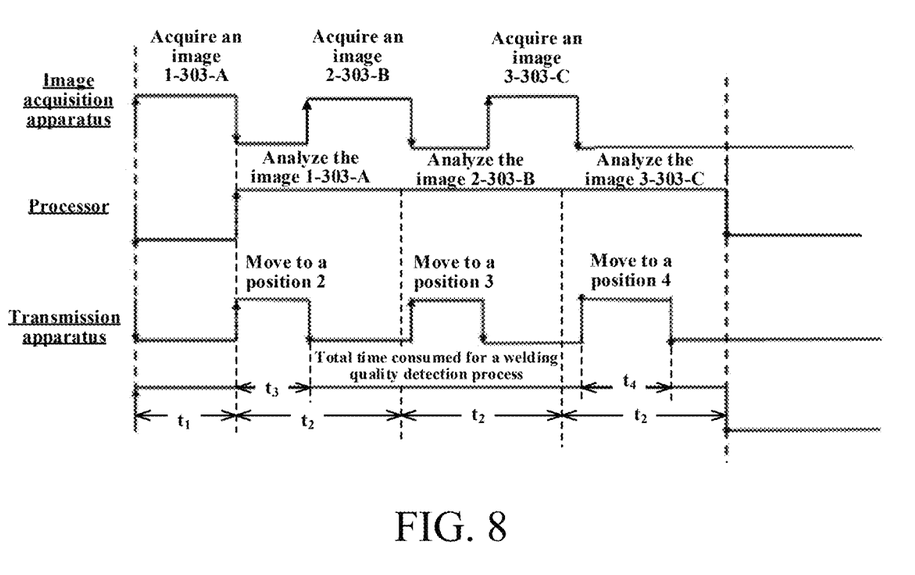

FIG. 7 and FIG. 8 are a time sequence diagram and a flowchart of welding quality detection according to some other embodiments of the present disclosure.

In a further embodiment, in response to moving to the new position, the image acquisition apparatus 101 acquires the second image of the second welding part. In this case, as shown in FIG. 7, when the welding quality of the battery cell 300 is detected, the following steps 701 to 711 are performed.

In step 701, the controller 104 controls the transmission apparatus 103 to move the battery cell 300 to position 1, and the welding part 303-A is located within the acquisition field of view of the image acquisition apparatus 101 at position 1. Step 702 is performed. In some embodiments, the battery cell 300 has been moved to position 1 before detection starts, and step 701 may be omitted. A time sequence diagram shown in FIG. 8 is calculating a consumed time starting from step 702.

In step 702, in response to the battery cell 300 having been moved to position 1, the controller 104 controls the image acquisition apparatus 101 to acquire an image 1-303-A at position 1. After step 702 is performed, step 703 to step 707 and step 708 to step 710 are performed at least partially in parallel.

In step 703, in response to ending of the acquisition of the image 1-303-A, the transmission apparatus 103 moves the battery cell 300 to position 2. The welding part 303-B of the battery cell 300 is located within the acquisition field of view of the image acquisition apparatus 101 at position 2. After step 703 is performed, step 704 is performed.

In step 704, the image acquisition apparatus 101 is controlled to acquire an image 2-303-B of the welding part 303-B of the battery cell 300. After step 704 is performed, step 705 is performed.

In step 705, in response to ending of the acquisition of the image 2-303-B, the transmission apparatus 103 moves the battery cell 300 to position 3. The welding part 303-C of the battery cell 300 is located within the acquisition field of view of the image acquisition apparatus 101 at position 3. After step 705 is performed, step 706 is performed.

In step 706, the image acquisition apparatus 101 is controlled to acquire an image 3-303-C of the welding part 303-C of the battery cell 300. After step 706 is performed, step 707 is performed.

In step 707, in response to the image acquisition apparatus 101 completing image acquisition of all to-be-detected welding parts of the battery cell 300, the battery cell 300 is moved to position 4, and the battery cell 300 is kept at position 4 until the detection result is determined.

Step 708 to step 710 are performed at least partially in parallel with step 703 to step 707.

In step 708, the processor 102 analyzes the image 1-303-A according to an indication of the controller 104, to determine welding quality of the welding part 303-A. After step 708 is performed, step 709 is performed.

In step 709, the processor 102 analyzes the image 2-303-B according to an indication of the controller 104, to determine welding quality of the welding part 303-B. After step 708 is performed, step 710 is performed.

In step 710, the processor 102 analyzes the image 3-303-C according to an indication of the controller 104, to determine welding quality of the welding part 303-C.

After steps 707 and 710 are performed, step 711 is performed.

In step 711, the controller 104 determines the detection result of the battery cell 300 at least partially based on the welding quality of the welding part 303-A, the welding quality of the welding part 303-B, and the welding quality of the welding part 303-C.

Similar to FIG. 6, FIG. 8 shows starting time and ending time of each step performed by the image acquisition apparatus 101, the processor 102, and the transmission apparatus 103 under control of the controller 104 when performing welding quality detection on a pre-welding point of a battery cell 300 based on the steps shown in FIG. 7. Time consumed by the image acquisition apparatus 101 to acquire an image of one welding part is $t_1$. Time consumed by the processor 102 to analyze an image is $t_2$. Time required by the transmission apparatus 103 to move the battery cell 300 from position 1 to position 2 or move the battery cell 300 from position 2 to position 3 is $t_3$, where $t_2 > t_3$. Time required by the transmission apparatus 103 to move the battery cell 300 from position 3 to position 4 is $t_4$.

It can be known according to FIG. 8 that based on the steps shown in FIG. 7, it takes $t_1 + 3t_2$ from the moment of acquiring the image 1-303-A at position 1 to the moment of completing detection on 10 welding points of the battery cell 300.

It can be known by comparing FIG. 6 with FIG. 8 that, compared with detecting the battery cell 300 based on the steps in FIG. 5, based on the steps in FIG. 7, time of at least $2t_1$ can be saved. Therefore, time for detecting the welding quality can be saved more effectively, and efficiency of detecting the welding quality can be improved.

In some embodiments, to ensure normal implementation of other procedures on a battery production line, detection time reserved for the welding quality detection procedure is a preset time. Regardless of a quantity of welding parts on the to-be-detected product, the welding parts all need to be completed within the preset time. In this case, according to the welding quality detection method provided in the present disclosure, detection time can be effectively reduced, and detection efficiency can be improved.

In some embodiments, the welding quality detection method provided in the present disclosure may further reduce a quantity of image acquisition apparatuses when it is ensured that welding quality detection is completed within a preset time period.

For example, assuming that the preset time is 5 s, $t_1 = 500$ ms, $t_2 = 1100$ ms, and $t_3 = 300$ ms. In this embodiment, if image acquisition and analysis are performed on each welding part of the battery cell 300 in series, and the battery cell or the image acquisition apparatus is moved to a new position, at least $3 \times (t_1 + t_2 + t_3) = 5.7$ s needs to be consumed, which exceeds the preset time. To complete detection of the welding quality within the preset time, without changing the detection logic, a quantity of image acquisition apparatuses 101 needs to be increased, which increases costs.

Time consumed for detecting a pre-welding point of the battery cell 300 according to the detection step shown in FIG. 5 is $3t_1 + 3t_2 = 4.8$ s. Time consumed for detecting a pre-welding point of the battery cell 300 according to the detection step shown in FIG. 7 is $t_1 + 3t_2 = 3.8$ s. The time required in the foregoing two cases is less than the preset time, and detection on the welding quality of all the pre-welding points of the battery cell 300 may be completed within the preset time without increasing a quantity of image acquisition apparatuses.

Time consumed for detecting a pre-welding point of the battery cell 300 according to the detection step shown in FIG. 7 is 3.8 s. If the preset time is 4 s, detection on the welding quality of all the pre-welding points of the battery cell 300 may be completed according to the detection step shown in FIG. 7 without increasing a quantity of acquisition apparatuses.

In addition to detection on the welding quality of each welding part of the to-be-detected product, the to-be-detected product needs to be further subsequently processed based on a detection result.

In some embodiments, the welding quality detection method 400 further includes: moving the to-be-detected product to a second position in response to the image acquisition apparatus 101 completing image acquisition of all to-be-detected welding parts of the to-be-detected product; and keeping the to-be-detected product at the second position until the detection result is determined.

The analysis of the image usually consumes more time than the acquisition of the image. After the acquisition of images of all the welding parts of the to-be-detected product is completed, it may be needed to wait for the processor 102 to analyze the images, and the controller 104 to determine a welding quality detection result of the to-be-detected product according to an analysis result of the processor 102. During this period, the to-be-detected product is moved to the second position to wait for the detection result, which may facilitate subsequent further centralized processing on the to-be-detected product according to the detection result. In addition, the current to-be-detected product does not occupy the acquisition field of view of the image acquisition apparatus 101 (to be specific, the current to-be-detected product is located at a second position different from the first position or the new position), which does not affect image acquisition of other to-be-detected products on a same battery production line by using a same welding quality detection system (at least a same image acquisition apparatus 101). This helps to improve the overall welding quality detection efficiency of the battery production line.

In some embodiments, the welding quality detection method 400 further includes: moving the to-be-detected product from the second position to a next procedure or a waste discharge station based on the determined detection result. Welding quality detection results may be classified into qualified detection results and unqualified detection results. When the detection result of the to-be-detected product is qualified, the to-be-detected product may enter a next procedure. When the detection result is unqualified, the to-be-detected product needs to be moved to a waste discharge station for waste.

It can be known from step 409 that the controller 104 determines a detection result of the to-be-detected product at least partially based on the welding quality of the first welding part and the welding quality of the second welding part. According to a process requirement, impact of the welding quality of the welding part on the detection result may be flexibly set.

For example, the welding quality of the welding part may be classified into a qualified quality and an unqualified quality. If the welding quality of any welding part of the to-be-detected product is unqualified, the detection result of the to-be-detected product is unqualified.

In this case, the controller 104 controls the transmission apparatus 103 to move the to-be-detected product from the second position to the waste discharge station when the welding quality of any welding part of the to-be-detected product is unqualified. In the foregoing manner, the processor 102 may not completely analyze images of other welding parts of the to-be-detected product. However, as long as the controller 104 receives a notification that the welding quality of any welding part is unqualified obtained through analysis by the processor 102, the controller 104 may determine that the to-be-detected product is unqualified, without waiting for completion of analysis on the images of the other welding parts. To save resources, the controller 104 immediately notifies the processor 102 to stop analyzing the images of other welding parts of the current to-be-detected product after determining the detection result.

If the to-be-detected product has not been moved to the second position, the controller 104 already determines that the detection result of the current to-be-detected product is unqualified. In this case, the image acquisition apparatus 101 may be acquiring an image of a welding part of the to-be-detected product, or the transmission apparatus 103 is moving the to-be-detected product. When the processor 102 determines through analysis that the welding quality of any welding part of the to-be-detected product is unqualified, the controller 104 controls the image acquisition apparatus 101 to stop acquiring the image of the welding part of the to-be-detected product, and controls the transmission apparatus 103 to directly move the to-be-detected product from a current position to the waste discharge station.

If the controller determines that the welding quality of all the welding parts of the to-be-detected product is qualified, the controller 104 controls the transmission apparatus 103 to move the to-be-detected product from the second position to a next procedure.

For another example, the welding quality of the welding part is classified into four levels: excellent, good, medium, and poor according to a requirement. When a ratio of a quantity of welding parts with poor welding quality to a total quantity of welding parts of a to-be-detected product exceeds a particular proportion or the quantity of welding parts with poor welding quality exceeds a particular value, a detection result of the to-be-detected product is unqualified.

For another example, the processor 102 scores the welding quality of each welding part of the to-be-detected product. A contribution of each welding part to a welding quality detection result may be adjusted by using a weight. When a weighted average score of the welding quality of each welding part of the to-be-detected product exceeds a preset value, the detection result of the to-be-detected product is qualified.

In some embodiments, the welding quality detection method 400 further includes: The transmission apparatus 103 moves the to-be-detected product or the image acquisition apparatus 101 to a second new position in response to ending of the acquisition of the second image. A third welding part of the to-be-detected product is located within the acquisition field of view of the image acquisition apparatus 101 at the second new position. The image acquisition apparatus 101 acquires, at the second new position, a third image of the third welding part of the to-be-detected product at the second new position. The processor 102 analyzes the third image according to the indication of the controller 104, to determine welding quality of the third welding part. That the controller 104 determines a detection result of the to-be-detected product at least partially based on the welding quality of the first welding part and the welding quality of the second welding part in step 409 includes: The controller 104 determines the detection result of the to-be-detected product at least partially based on the welding quality of the first welding part, the welding quality of the second welding part, and the welding quality of the third welding part. In the foregoing manner, the to-be-detected product includes three or more welding parts.

In some embodiments, the first welding part, the second welding part, and the third welding part are equally spaced. For example, as shown in FIG. 3, the first welding part is the welding part 303-A, the second welding part is the welding part 303-B, and the third welding part is the welding part 303-C. The welding part 303-A, the welding part 303-B, and the welding part 303-C are equally spaced. When the welding parts are equally spaced, each movement distance is the same. Therefore, a movement distance of the to-be-detected product or the image acquisition apparatus 101 does not need to be adjusted according to distribution of the welding parts, which can save movement time, thereby helping to improve efficiency of detecting the welding quality. At this point, the embodiments of the present disclosure have been described in detail. Although some particular embodiments of the present disclosure have been described in detail by using examples, a person skilled in the art should understand that the foregoing examples are merely for description and are not intended to limit the scope of the present disclosure. A person skilled in the art should understand that modifications may be made to the foregoing embodiments or equivalent replacements may be made to some technical features without departing from the scope and spirit of the present disclosure. The scope of the present disclosure is limited by the appended claims.

What is claimed is:

1. A welding quality detection system, applied to a battery production line, wherein the welding quality detection system comprises: a conveyor belt, track, or mechanical arm, an image acquisition camera having a field of view, a controller, and a processor, and the controller is communicatively connected to the conveyor belt, track, or mechanical arm, the image acquisition camera, and the processor, wherein
   the conveyor belt, track, or mechanical arm is configured to move one of:
   a to-be-detected product having at least first and second welding parts arranged such that the first and second welding parts cannot be at a same time within the field of view of the image acquisition camera; and
   the image acquisition camera,
   to a first relative position of the to-be-detected product and the image acquisition camera where the first welding part is within the field of view of the image acquisition camera, where the image acquisition camera is configured to acquire a first image of the first welding part; and
   in response to the image acquisition camera ending the acquisition of the first image, the conveyor belt, track, or mechanical arm is configured to move the one of:
   the to-be-detected product; and
   the image acquisition camera,
   to a second relative position of the to-be-detected product and the image acquisition camera where the second welding part is within the field of view of the image acquisition camera, where the image acquisition camera is configured to acquire
   a second image of the second welding part;
   the controller is configured to indicate the processor to analyze the first image, and indicate the processor to analyze the second image;

the processor is configured to analyze, according to the indication of the controller, the first image at least partially in parallel with the movement of the to-be-detected product or the image acquisition camera to the second relative position, to determine a welding quality of the first welding part, and analyze the second image, to determine a welding quality of the second welding part; and the controller is further configured to determine a detection result of the to-be-detected product at least partially based on the welding quality of the first welding part and the welding quality of the second welding part.

2. The welding quality detection system according to claim 1, wherein the controller is further configured to receive, when the acquisition of the first image ends, an acquisition ending indication from the image acquisition camera, and control, in response to the acquisition ending indication, the conveyor belt, track, or mechanical arm to move the to-be-detected product or the image acquisition camera to the second relative position.

3. The welding quality detection system according to claim 1, wherein:

the controller is further configured to receive a first moved-into-position indication in response to the to-be-detected product or the image acquisition camera having been moved to the first relative position, and control, in response to the first moved-into-position indication, the image acquisition camera to start acquiring the first image of the first welding part.

4. The welding quality detection system according to claim 1, wherein the image acquisition camera is further configured to acquire the second image of the second welding part in response to the to-be-detected product or the image acquisition camera being moved to the second relative position.

5. The welding quality detection system according to claim 4, wherein the controller is further configured to receive a second moved-into-position indication in response to the to-be-detected product or the image acquisition camera having been moved to the new position, and control, in response to the second moved-into-position indication, the image acquisition camera to start acquiring the second image of the second welding part.

6. The welding quality detection system according to claim 1, further comprising:

a second conveyor belt, track, or mechanical arm, configured to move the to-be-detected product to a waiting position in response to the image acquisition camera completing image acquisition of all to-be-detected welding parts of the to-be-detected product, wherein the to-be-detected product is kept at the waiting position until the detection result is determined.

7. The welding quality detection system according to claim 6, further comprising:

a third conveyor belt, track, or mechanical arm, configured to move the to-be-detected product from the waiting position to a next procedure or a waste discharge station based on the determined detection result.

8. The welding quality detection system according to claim 1, wherein the to-be-detected product is a battery cell, the battery cell comprises a top cover and a shell, and the first welding part and the second welding part respectively comprise one or more pre-welding points between the top cover and the shell; optionally, wherein a distribution pattern of pre-welding points of the first welding part is the same as a distribution pattern of pre-welding points of the second welding part, or the distribution pattern of the pre-welding points of the first welding part is a subset of the distribution pattern of the pre-welding points of the second welding part.

9. The welding quality detection system according to claim 8, wherein the image acquisition camera comprises a plurality of partial-image acquisition cameras having each a partial field of view, and the partial fields of view of the partial image acquisition apparatuses are distributed according to the distribution pattern of the pre-welding points of the first welding part.

10. The welding quality detection system according to claim 1, wherein:

the to-be-detected product has a third welding part arranged such that none of the first, second and third welding parts can be at a same time within the field of view of the image acquisition camera; and the conveyor belt, track, or mechanical arm is further configured to move the to-be-detected product or the image acquisition camera to a third relative position of the to-be-detected product or the image acquisition camera in response to ending of the acquisition of the second image, wherein the third welding part of the to-be-detected product is located within the acquisition field of view of the image acquisition camera at the third relative position of the to-be-detected product or the image acquisition camera;

the image acquisition camera is further configured to acquire a third image of the third welding part of the to-be-detected product at the third relative position of the to-be-detected product or the image acquisition camera;

the controller is further configured to indicate the processor to analyze the third image; the processor is further configured to analyze the third image, to determine a welding quality of the third welding part; and the controller is further configured to determine the detection result of the to-be-detected product at least partially based on the welding quality of the first welding part, the welding quality of the second welding part, and the welding quality of the third welding part.

11. A welding quality detection method, applied to a welding quality detection system of a battery production line, wherein the welding quality detection system comprises a controller, a processor, an image acquisition camera having a field of view, and a conveyor belt, track, or mechanical arm, and the method comprises:

providing a to-be-detected product having at least first and second welding parts arranged such that the first and second welding parts cannot be at a same time within the field of view of the image acquisition camera, the to-be-detected product being in a first position with respect to the image acquisition camera such that the first welding part is in the field of view of the image acquisition camera;

with the image acquisition apparatus, acquiring a first image of the first welding part of the to-be-detected product;

with the conveyor belt, track, or mechanical arm, moving the to-be-detected product or the image acquisition camera to a second position in response to ending of the acquisition of the first image, wherein the second welding part of the to-be-detected product is located within the acquisition field of view of the image acquisition camera at the second position;

with the image acquisition camera, acquiring, at the second position, a second image of the second welding part of the to-be-detected product;

with the processor, analyzing the first image according to an indication of the controller, to determine a welding quality of the first welding part;

with the processor, analyzing the second image according to the indication of the controller, to determine a welding quality of the second welding part; and with the controller, determining a detection result of the to-be-detected product at least partially based on the welding quality of the first welding part and the welding quality of the second welding part, wherein the analysis of the first image and the movement of the to-be-detected product or the image acquisition apparatus to the second position are at least partially performed in parallel.

12. The welding quality detection method according to claim 11, wherein the conveyor belt, track, or mechanical arm moving the to-be-detected product or the image acquisition camera to the second position in response to ending of the acquisition of the first image comprises:

with the controller, receiving an acquisition ending indication when the acquisition of the first image ends; and with the controller, controlling, in response to the acquisition ending indication, the conveyor belt, track, or mechanical arm to start moving the to-be-detected product or the image acquisition apparatus to the second position and/or with the conveyor belt, track, or mechanical arm, moving the to-be-detected product to the first position before the first image is acquired; and with the controller, receiving a first moved-into-position indication in response to the to-be-detected product having been moved to the first position, wherein the image acquisition apparatus acquiring the first image of the first welding part of the to-be-detected product comprises:

the controller controls, in response to the first moved-into-position indication, the image acquisition apparatus to start acquiring the first image.

13. The welding quality detection method according to claim 11, wherein the image acquisition camera acquiring, at the second position, a second image of the second welding part of the to-be-detected product comprises:

with the image acquisition camera, acquiring the second image of the second welding part in response to the to-be-detected product or the image acquisition apparatus being moved to the second position; optionally, wherein the image acquisition camera acquires the second image of the second welding part in response to the to-be-detected product or the image acquisition apparatus being moved to the second position comprises:

with the controller, receiving a second moved-into-position indication in response to the to-be-detected product or the image acquisition apparatus having been moved to the second position; and with the controller, controlling, in response to the second moved-into-position indication, the image acquisition camera to start acquiring the second image.

14. The welding quality detection method according to claim 11, further comprising: moving the to-be-detected product to a waiting position in response to the image acquisition apparatus completing image acquisition of all to-be-detected welding parts of the to-be-detected product; and keeping the to-be-detected product at the waiting position until the detection result is determined.

15. The welding quality detection method according to claim 11, wherein the analysis of the first image and the movement of the to-be-detected product or the image acquisition apparatus to the second position are simultaneously performed; and/or the analysis of the second image is performed after the analysis of the first image is completed.

16. The welding quality detection method according to claim 11, wherein the to-be-detected product is a battery cell, the battery cell comprises a top cover and a shell, and the first welding part and the second welding part respectively comprise one or more pre-welding points between the top cover and the shell.

17. The welding quality detection method according to claim 16, wherein a distribution pattern of pre-welding points of the first welding part is the same as a distribution pattern of pre-welding points of the second welding part; and/or, the distribution pattern of the pre-welding points of the second welding part is a subset of the distribution pattern of the pre-welding points of the first welding part.

18. The welding quality detection method according to claim 16, wherein the image acquisition camera comprises a plurality of sub-image acquisition cameras having each and acquisition sub-field of view, the sub-field of views of the sub-image acquisition cameras being distributed according to the distribution pattern of the pre-welding points of the first welding part.

19. The welding quality detection method according to claim 11, wherein the to-be-detected product has a third welding part arranged such that none of the first, second and third welding parts can be at a same time within the field of view of the image acquisition camera;

the method further comprising: with the conveyor belt, track, or mechanical arm, moving the to-be-detected product or the image acquisition camera to a third position in response to ending the acquisition of the second image, wherein the third welding part of the to-be-detected product is located within the acquisition field of view of the image acquisition apparatus at the third position;

with the image acquisition apparatus, acquiring, at the second new position, a third image of the third welding part of the to-be-detected product at the third position; and with the processor, analyzing the third image according to the indication of the controller, to determine a welding quality of the third welding part, wherein with the controller, determining a detection result of the to-be-detected product at least partially based on the welding quality of the first welding part and the welding quality of the second welding part comprises:

with the controller, determining the detection result of the to-be-detected product at least partially based on the welding quality of the first welding part, the welding quality of the second welding part, and the welding quality of the third welding part.

20. The welding quality detection method according to claim 19, wherein the first welding part, the second welding part, and the third welding part are equally spaced.

* * * * *